(12) United States Patent
Horii

(10) Patent No.: US 8,965,049 B2
(45) Date of Patent: Feb. 24, 2015

(54) FUNCTION EXTENSION DEVICE, FUNCTION EXTENSION METHOD, COMPUTER-READABLE RECORDING MEDIUM, AND INTEGRATED CIRCUIT

(75) Inventor: Yuki Horii, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 181 days.

(21) Appl. No.: 13/811,092

(22) PCT Filed: Jan. 20, 2012

(86) PCT No.: PCT/JP2012/000357
§ 371 (c)(1),
(2), (4) Date: Jan. 18, 2013

(87) PCT Pub. No.: WO2012/105175
PCT Pub. Date: Aug. 9, 2012

(65) Prior Publication Data
US 2013/0156266 A1    Jun. 20, 2013

(30) Foreign Application Priority Data

Feb. 1, 2011   (JP) ................................. 2011-019784

(51) Int. Cl.
*G06K 9/00* (2006.01)
*G06F 3/01* (2006.01)
(Continued)

(52) U.S. Cl.
CPC ............ *G06K 9/00624* (2013.01); *G06F 3/012* (2013.01); *G06F 3/016* (2013.01); *G06F 3/04815* (2013.01); *G06F 3/0483* (2013.01); *G02B 27/017* (2013.01); *G02B 2027/0134* (2013.01); *G02B 2027/014* (2013.01)

USPC .......................................... 382/103; 345/633

(58) Field of Classification Search
USPC ................. 382/100, 103, 276, 278, 279, 294;
708/422; 345/564, 566, 568, 633;
715/706, 757; 711/6
See application file for complete search history.

(56) References Cited

U.S. PATENT DOCUMENTS 7,031,875 B2 *  4/2006  Ellenby et al. ................. 702/150
7,069,516 B2 *  6/2006  Rekimoto ...................... 715/757
(Continued)

FOREIGN PATENT DOCUMENTS

| JP | 10-207620 | 8/1998 |
| JP | 2001-154781 | 6/2001 |
| JP | 2004-531791 | 10/2004 |

OTHER PUBLICATIONS

International Search Report issued Apr. 17, 2012 in International (PCT) Application No. PCT/JP2012/000357.

*Primary Examiner* — Anand Bhatnagar
(74) *Attorney, Agent, or Firm* — Wenderoth, Lind & Ponack, L.L.P.

(57) ABSTRACT

An object recognition unit recognizes, from real-space video data, a body included in the video data. A function setting unit retains function information in which is prescribed a function configured from a pair of operation and processing that can be set for each type of body. In addition, the function setting unit sets, to each body recognized by the object recognition unit, a function that can be set, based on the type of each body. A selection determination unit determines a selected body selected by a user as the body to be operated among the respective bodies recognized by the object recognition unit. An operation determination unit determines the operation that the user has performed on the selected body. A processing determination unit 1107 determines the processing for the operation that has been determined by the operation determination unit among the operations configuring the function set by the function setting unit.

15 Claims, 7 Drawing Sheets

(51) Int. Cl.
*G06F 3/0481* (2013.01)
*G06F 3/0483* (2013.01)
*G02B 27/01* (2006.01)

(56) References Cited

U.S. PATENT DOCUMENTS

| | | | |
|---|---|---|---|
| 8,082,245 B2 * | 12/2011 | Bates et al. | 707/724 |
| 8,428,306 B2 * | 4/2013 | Ikenoue | 382/103 |
| 8,743,145 B1 * | 6/2014 | Price | 345/633 |
| 2002/0140745 A1 | 10/2002 | Ellenby et al. | |
| 2003/0156135 A1 * | 8/2003 | Lucarelli | 345/757 |
| 2006/0161379 A1 * | 7/2006 | Ellenby et al. | 702/150 |
| 2012/0075490 A1 * | 3/2012 | Tsai et al. | 348/222.1 |
| 2012/0183137 A1 * | 7/2012 | Laughlin | 380/200 |
| 2012/0206452 A1 * | 8/2012 | Geisner et al. | 345/419 |
| 2012/0293506 A1 * | 11/2012 | Vertucci et al. | 345/419 |

* cited by examiner

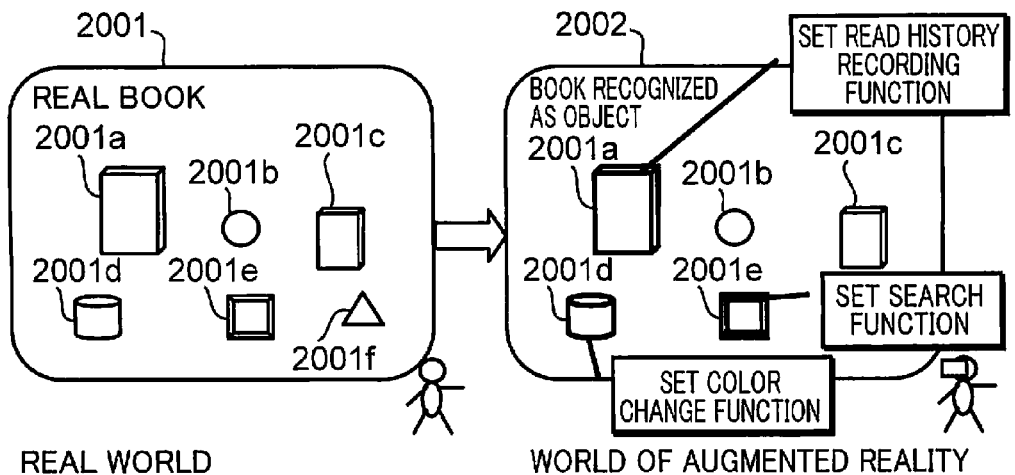
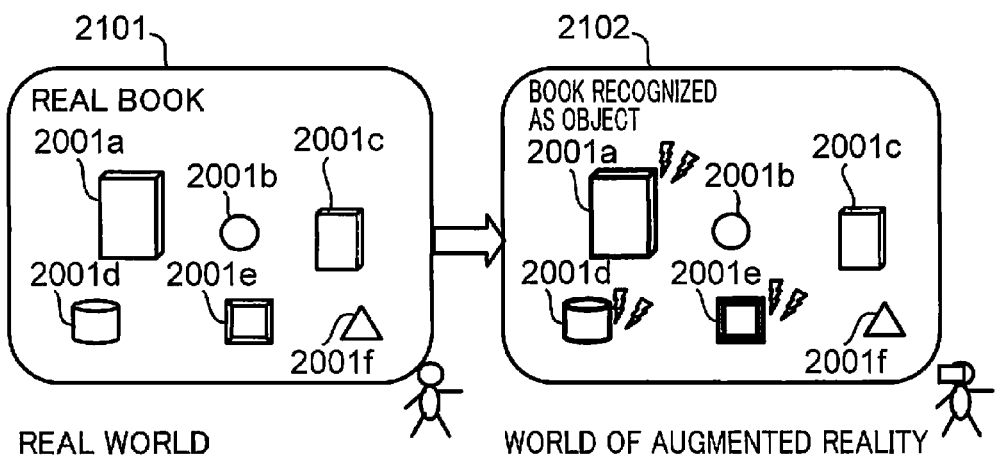

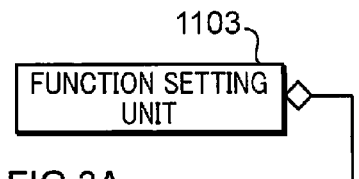

| | FUNCTION CATEGORY | BODY TYPE | FUNCTION |
|---|---|---|---|
| 3011 — A | RECORD WRITE HISTORY | BOOK, WHITEBOARD | ● |
| 3012 — B | DRESS-UP | PERSON – ADULT | |
| 3013 — C | MARKING | BALL, GLOBE | |
| 3014 — D | SEARCH FUNCTION | GLOBE | |
| 3015 — E | COLOR CHANGE FUNCTION | CAN | |
| 3016 — T | DISPLAY TYPE | COMMON TO ALL BODIES | |

FUNCTION CATEGORY CANDIDATE INFORMATION (columns: 3001, 3002, 3003, 3004)

FIG.3C

| | | | |
|---|---|---|---|
| 3111 — A-a | DEFAULT FUNCTION | ● | |
| 3112 — A-b | CUSTOMIZED FUNCTION 1 | | |
| 3113 — A-c | CUSTOMIZED FUNCTION 2 | | |

FUNCTION LIST INFORMATION (columns: 3101, 3102, 3103)

| | USER OPERATION | PROCESSING |
|---|---|---|
| 3211 — | HOLD WITH BOTH HANDS | DISPLAY UP TO PREVIOUS WRITE HISTORY |
| 3212 — | OPEN OR INITIAL WRITING TRACE | START RECORD WRITE HISTORY |
| 3213 — | TRACE | UNDERLINE |
| 3214 — | WRITE | ENTER CHARACTER |
| 3215 — | CLOSE OR PUT DOWN PEN | END RECORD WRITE HISTORY |

FUNCTION CORRESPONDENCE INFORMATION (columns: 3201, 3202)

FIG.4A

1103 FUNCTION SETTING UNIT

| | BODY | | FUNCTION | | |
|---|---|---|---|---|---|
| | Object ID (4001) | BODY TYPE (4002) | FUNCTION CATEGORY (4003) | FUNCTION (4004) | SET USER (4005) |
| 4011 | ID1 | BOOK | A. RECORD WRITE HISTORY | A-a | MR. A |
| 4012 | | | A. RECORD WRITE HISTORY | A-b | MR. B |
| 4013 | ID2 | ERASER | T. DISPLAY TYPE | T-a | NONE |
| 4014 | ID3 | PEN CASE | NONE | NONE | NONE |
| 4015 | ID4 | BOOK | T. DISPLAY TYPE | T-a | NONE |
| 4016 | ID5 | CAN | E. COLOR CHANGE FUNCTION<br>T. DISPLAY TYPE | E-b,<br>T-a | MR. B<br>MR. A |
| 4017 | | | E. COLOR CHANGE FUNCTION | E-a | MR. A |
| 4018 | ID6 | GLOBE | D. SEARCH FUNCTION<br>T. DISPLAY TYPE | D-a,<br>T-a | MR. A |

FUNCTION SETTING INFORMATION

FIG.4B

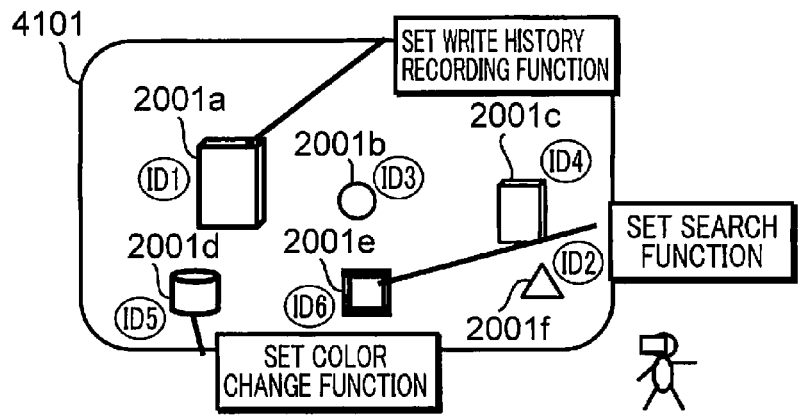

FIG.7
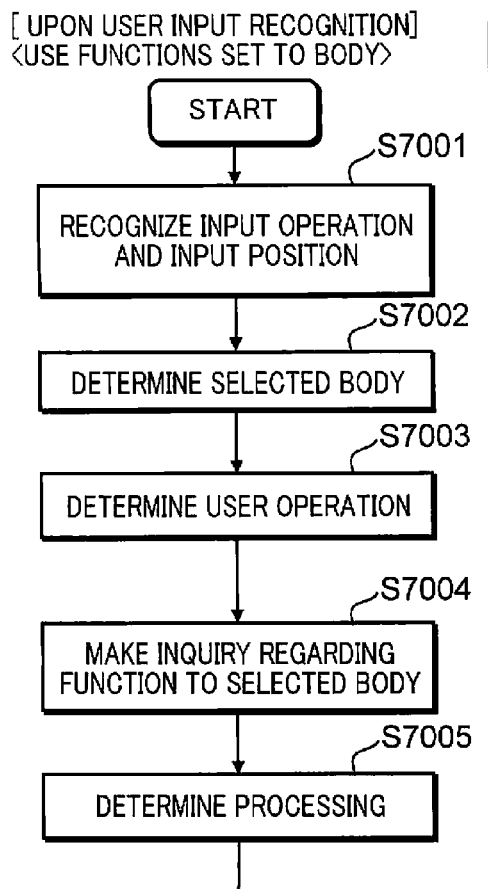
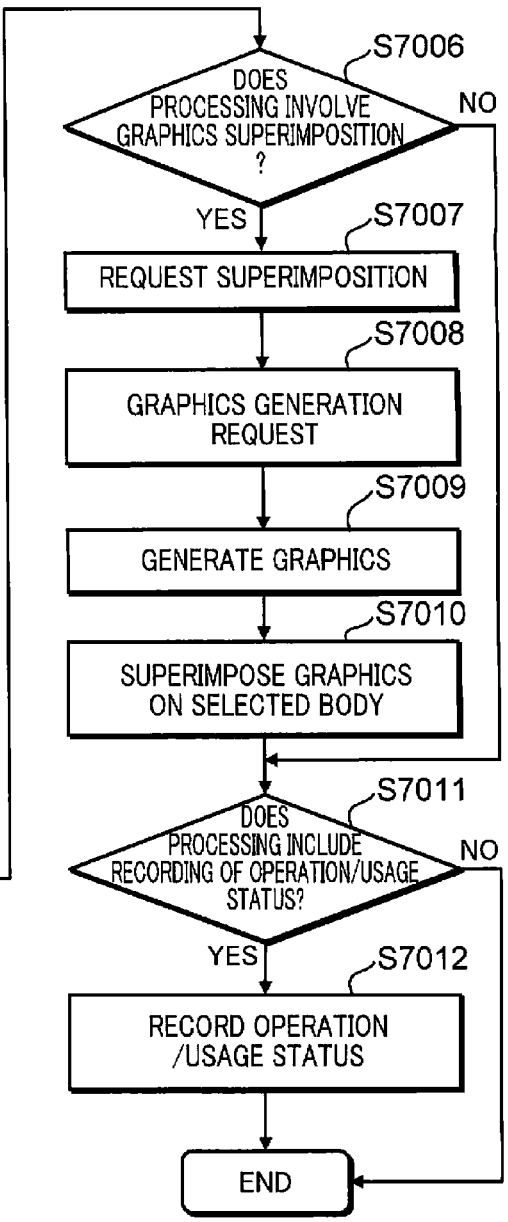

FUNCTION EXTENSION DEVICE, FUNCTION EXTENSION METHOD, COMPUTER-READABLE RECORDING MEDIUM, AND INTEGRATED CIRCUIT

TECHNICAL FIELD

The present invention relates to technology of setting a function to a body recognized in an extended real space.

BACKGROUND ART

As technology of setting a function to a body that was recognized as an object in an extended real space, conventionally, known is technology of using a search function that is assigned to a body in advance.

Here, the term "function" to be set to a body that was recognized as an object refers to the interaction between the user and the body, and is configured from a pair of a series of operations performed by the user and the processing that is respectively performed for such series of operations. More specifically, a "function" is configured from a pair of "operation" which is an input from the user to the body, and "processing" which is executed as feedback to the operation performed by the user.

As examples of a "function", considered may be a write history recording function, a color change function, a search function, and so on. In the case of a search function, in response to the "operation" of the user giving instructions to the body, the "processing" of searching for information of the instructed body and visually presenting the search result to the user is performed.

For example, Patent Document 1 discloses a pointing system which provides information relates to a body that is of interest to the user.

The user points one's hand-held device toward a body to be addressed (corresponds to the "operation" described above). This hand-held device measures the position and posture, creates a reference, and determines which body is being addressed by searching a database containing information related to pre-programmed bodies. Subsequently, information related to the body which was determined as the body that is currently being address is presented to the user interface (corresponds to the "processing" described above).

Nevertheless, with the configuration of Patent Document 1, the type of information to be presented regarding the addressed body is predetermined. In other words, the function to be assigned to the addressed body is predetermined. Accordingly, Patent Document 1 lacks a mechanism of adding or deleting functions to or from the body among a plurality of functions. Thus, while it is possible to use functions that were pre-set to the body, it is not possible to dynamically add or delete functions.

Moreover, Patent Document 1 also lacks a mechanism for setting for functions that can be set to a body according to the type of body, and a mechanism for determining the functions that can be assigned to each type of body. Thus, it is not possible to add, to a body, a function that suits the type of body.

A function that suits the type of body is, for example, a function capable of assigning a write history recording function to a type of body such as a book, and a function capable of assigning search function and a color change function to a type of body such as a globe.

Nevertheless, the technology of Patent Document 1 lacks the mechanism of determining the functions that can be assigned to each type of body. Thus, in cases where book, whiteboard, and globe exist as the type of body, and write history recording function, color change function, and search function exist as the functions that the system can assign to the body, it is not possible to add a function upon determining which function should be assigned to which body.

Patent Document 1: Japanese Translation of PCT Application No. 2004-531791

SUMMARY OF THE INVENTION

A object of this invention is to provide a function extension device, a function extension method, a function extension program, and an integrated circuit capable of dynamically setting, to a body in a real space that was incorporated into an extended real space, a function that suits the type of that body.

The function extension device according to one aspect of the present invention is a function extension device for incorporating a body in a real space into an extended real space, and setting a function to the body, including: an object recognition unit which recognizes, from real-space video data acquired by a video input device, a body included in the video data, and recognizes a type of recognized body and a position of the recognized body in the real space; a function setting unit which retains function information in which is prescribed a function configured from a pair of operation and processing that can be set for each type of body, refers to the function information when a body is recognized by the object recognition unit, and sets a function to the recognized body based on the type of recognized body; an input recognition unit which recognizes an input operation performed by a user in the real space and an input position in the real space where the input operation has been performed; a selection determination unit which determines a selected body that was selected by the user as a body to be operated based on the position of the body in the real space recognized by the object recognition unit and the input position in the real position recognized by the input recognition unit; an operation determination unit which determines the operation of the user by using the input operation recognized by the input recognition unit; a processing determination unit which determines the processing for the operation that has been determined by the operation determination unit among the operations configuring the function set by the function setting unit to the selected body selected by the selection determination unit; and an execution unit which executes the processing determined by the processing determination unit.

Moreover, the function extension method, the function extension program, and the integrated circuit according to another aspect of the present invention comprise similar features as the foregoing function extension device.

BRIEF DESCRIPTION OF THE DRAWINGS

FIGS. 2 are diagrams schematically showing the function extension system illustrated in FIG. 1 recognizing a body in a real space, the processing of setting functions according to the type of that body, and an example of the processing that uses the set functions.

FIGS. 3 are diagrams schematically showing an example of the function information retained by the function setting unit.

FIG. 4A is a diagram showing an example of the function setting information showing the functions that were set by the function setting unit to the respective bodies that were recognized as an object by the object recognition unit, and FIG. 4B is a diagram schematically showing an example of the functions set by the function extension device according to an embodiment of the present invention to the bodies that were recognized as an object.

FIG. 7 is a flowchart showing the function extension device according to an embodiment of the present invention recognizing the user's operation, and an example of the processing to be implemented upon executing the functions that were set to the body.

DESCRIPTION OF EMBODIMENTS

Figure 1:
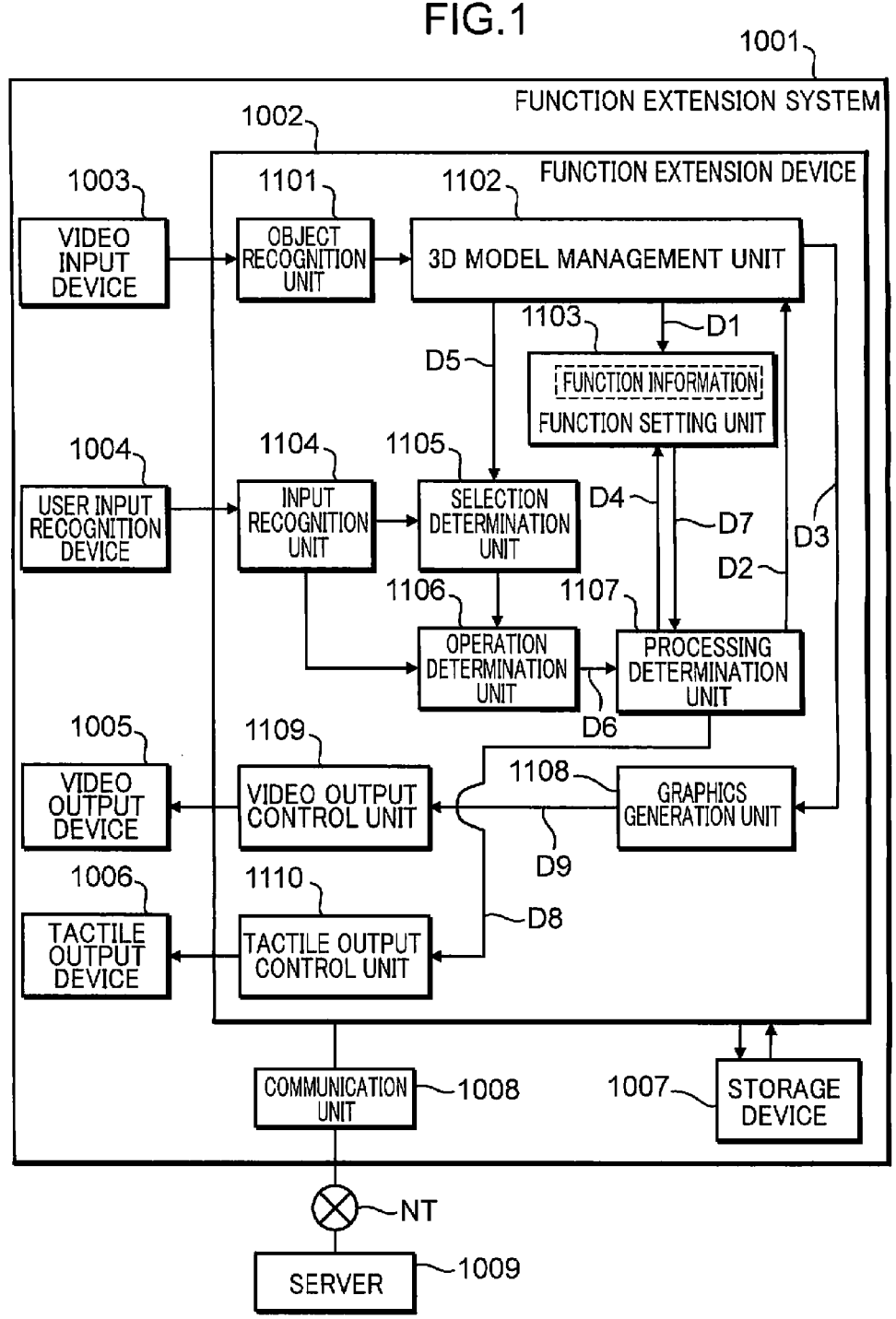
FIG. 1 is a block diagram showing a configuration example of the function extension system to which the function extension device according to an embodiment of the present invention is applied.

Embodiments of the present invention are now explained with reference to the drawings. Note that the drawings used for the ensuing explanation are referred to for explaining the technical features that may be adopted by the present invention, and the configuration, processing and other matters of the device indicated therein merely illustrate an example. Accordingly, unless there is a special description intended to limit the present invention, the configuration and processing of the device are not limited to the described contents.

The function extension device according to the embodiments of the present invention is a device for recognizing a body existing in a real space as a body, incorporating the body into an extended real space, adding a new function to the body that was recognized as an object, and allowing a user to use the added function. In other words, the function extension device of this invention is not only a device that sets a fixed function to the body that was recognized as an object, but also a device which adds a function that matches the type of body or a function that suits that body, and allows a user to use the fixed functions and the added functions.

Here, the term "function" to be set to a body that was recognized as an object refers to the interaction between the user and the body, and is configured from a pair of a series of operations and processing performed by user. Here, the term "operation" refers to the operation that the user performs to the body. Moreover, the term "processing" refers to the processing that is executed as feedback of the foregoing "operation" from the body to the user.

More specifically, a "function" is configured from a pair of "operation" which is an input from the user to the body, and "processing" which is an output from the body to the user and executed as feedback to the "operation". As examples of a "function", there are, for instance, a write history recording function, a color change function, a search function, and so on.

Here, a search function is configured, for example, from a pair of "operation" of the user giving instructions to the body, and "processing" of searching for information of the instructed body from a database and visually presenting the search result to the user.

Here, for example, the processing of outputting a video synchronously or asynchronously to the body operated by the user corresponds to the "processing". As the processing of synchronously outputting a video to the body, for example, considered may be generating graphics related to the body to be operated when the user operates a body, and superimposing the generated graphics on the body to be operated and outputting the result. Moreover, as the processing of asynchronously outputting a video to the body, for example, considered may be retaining data according to the operation contents when the user operates a body, and, after the operation to the body is complete, generating graphics from the retained data, and associating the generated graphics with the body and outputting the result.

Consequently, in an extended real space, the user can use the new functions added to the body through an output device such as a head-mount display, a 3D stereoscopic TV, or a tactile output device.

For example, when a write history recording function is added as a "function" and the user performs the operation of "trace" to a book in a real space, graphics that underline the traced portion are superimposed and displayed on the book in the extended real space. Here, as the superimposition and display, only the graphics associated with the operation may be superimposed and displayed on the body in the extended real space, or the graphics associated with the operation may be additionally superimposed and displayed on the superimposed and displayed graphics.

Moreover, when the user reopens a book in an extended real space which that user has operated in the past, graphics may be generated from the data that was retained during the past operation, and the generated graphics may be superimposed and displayed on the body. Consequently, in an extended real space, the user can underline sections of a book with one's finger and subsequently confirm the underlined sections.

In this embodiment, the "operation" is basically explained on the basis of the user moving one's hand and inputting the operation. Nevertheless, the "operation" in the present invention is not limited to hand movements, and line of sight or audio (language) or the like may also be adopted as the operation.

Moreover, in this embodiment, the "processing" is basically explained on the basis of a video output which superimposed and displays graphics on the body. Nevertheless, the "processing" is not limited to video outputs, and, for example, other outputs such as an audio output or tactile output may also be adopted.

The function extension device according to an embodiment of the present invention is now explained in detail taking a case of applying it to a function extension system. FIG. 1 is a block diagram showing a configuration example of the function extension system 1001 to which the function extension device 1002 according to an embodiment of the present invention is applied. Note that the function extension system 1001 shown in FIG. 1 is mounted, for example, on a head-mount display (HMD). Moreover, the function extension device 1002 shown in FIG. 1 is configured from a microcomputer comprising, for example, a CPU, a ROM, a RAM and the like, and the functions of the respective blocks are realized by, for instance, a CPU executing the function extension program of the present invention. The extended function program is stored in a storage device such as a ROM or a RAM.

Specifically, an object recognition unit 1101, a 3D model management unit 1102, an input recognition unit 1104, a selection determination unit 1105, an operation determination unit 1106, a processing determination unit 1107, a graphics generation unit 1108, a video output control unit 1109, and a tactile output control unit 1110 are, for example, respectively programs included in the extended function program stored in the storage device 1007, and are configured to be read from the storage device 1007 and executed by the CPU.

The function setting unit 1103 is a program included in the extended function program stored in the storage device 1007, and is configured to be read from the storage device 1007 and executed by the CPU.

The function setting unit 1103 that is read from the storage device 1007 and executed by the CPU reads, for example, function information from the storage device 1007 and stores the function information in the RAM. Note that, while the object recognition unit 1101, the 3D model management unit 1102, the input recognition unit 1104, the selection determination unit 1105, the operation determination unit 1106, the processing determination unit 1107, the graphics generation unit 1108, the video output control unit 1109, the tactile output control unit 1110 and the function setting unit 1103 included in the function extension device 1002 shown in FIG. 1 were respectively configured as a program stored in the storage device 1007 and executed by the CPU, the configuration is not limited thereto.

For example, the object recognition unit 1101, the 3D model management unit 1102, the input recognition unit 1104, the selection determination unit 1105, the operation determination unit 1106, the processing determination unit 1107, the graphics generation unit 1108, the video output control unit 1109, the tactile output control unit 1110 and the function setting unit 1103 included in the function extension device 1002 shown in FIG. 1 may also be configured from a dedicated processing circuit (for example, an integrated circuit such as an LSI).

The function extension system 1001 comprises a function extension device 1002, a video input device 1003, a user input recognition device 1004, a video output device 1005, a tactile output device 1006, a storage device 1007, and a communication unit 1008.

The function extension device 1002 comprises an object recognition unit 1101, a 3D model management unit 1102, a function setting unit 1103, an input recognition unit 1104, a selection determination unit 1105, an operation determination unit 1106, a processing determination unit 1107, a graphics generation unit 1108, a video output control unit 1109 (example of an execution unit), and a tactile output control unit 1110 (example of an execution unit).

The respective configurations of the function extension device 1002 are now explained. The object recognition unit 1101 recognized, from the real-space video data acquired by the video input device 1003, a body included in the video data, and recognizes the type of recognized body and the position of the recognized body in the real space. Specifically, the object recognition unit 1101 receives, from the video input device 1003, the video data that was acquired by the video input device 1003 capturing the real space. In addition, the object recognition unit 1101 recognizes the type, shape and size of the body included in the supplied video data as well as the position of the body in the real space, and notifies the 3D model management unit 1102 of the result.

Here, when the video input device 1003 is configured, for example, from a 3D camera, the object recognition unit 1101 can recognize a body by performing the following processing. Foremost, the object recognition unit 1101 acquires dual system video data of different lines of sight from the video input device 1003. Subsequently, the video input device 1003 performs characteristic point extraction processing to the video data of one system and extracts the characteristics points included in the video data. As the characteristic points, for example, there are points on the outline form of the body and which characterize the shape of the body such as the apex and points with a large curvature. Subsequently, the object recognition unit 1101 clusters the characteristics points that were extracted from the video data and sorts them into a plurality of characteristic point groups, and identifies a body that is indicated by the characteristic point group from the arrangement pattern of the characteristics points in the characteristic point group. In the foregoing case, the object recognition unit 1101 may retain, in advance, the reference arrangement patterns as the arrangement patterns of the characteristics points to become the reference regarding the various bodies, and compare the reference arrangement patterns with the arrangement pattern of the characteristics points that were extracted from the video data in order to identify the body indicated by the characteristic point group.

Note that, as this kind of technology of recognizing a body, known is the face recognition technology that is broadly adopted in digital cameras and the like, and the object recognition unit 1101 may recognize the body included in the video data by using a method that is similar to this face recognition technology.

In addition, the object recognition unit 1101 identifies the corresponding points that indicate the same locations as the respective characteristic points of the identified body from the video data of the other system. Subsequently, the object recognition unit 1101 may obtain the 3-dimensional position of the respective characteristics points in the real space by adopting the stereo method from the disparity between the respective characteristic points and the respective corresponding points, and recognize the position of the respective characteristic points in the real space as the position of the body.

Moreover, the object recognition unit 1101 may also recognize the body included in the video data by recognizing the marker information assigned to the body in a real space. Here, "marker information" is information describing information such as the type, shape, size, and position of the body. For example, marker information in the form of a bar code or symbol string may be assigned to the body, and the object recognition unit 1101 may recognize the bar code from the video data, and recognize the type, shape and size of the body and the position of the body in the real space based on the recognized bar code or symbol string.

Moreover, the marker information may also be stored in an IC tag and retained in the body, and the object recognition unit 1101 may read the data retained in the IC tag to acquire the marker information. In the foregoing case, an IC tag reader may be provided to the function extension system 1001, and the object recognition unit 1101 may cause the IC tag reader to read the marker information and acquire the marker information.

Note that the position included in the marker information indicates, for example, the longitude and latitude where the body is positioned. In addition, a GPS is provided to the function extension system 1001. The object recognition unit 1101 may recognize the position of the function extension system 1001 in the real space based on the GPS, compare the recognized position with the position of the body included in the marker information, and obtain a relative position of the body relative to the function extension system 1001.

Moreover, when the video input device 1003 is configured from a depth sensor, for example, the object recognition unit 1101 extracts the characteristics points of the body from the image data of the distance component acquired by the video input device 1003. Subsequently, the type, shape and size of the body and the position of the body in the real space may be recognized from the arrangement pattern of the extracted characteristic points.

The 3D model management unit 1102 is notified of the type, shape and size of each body recognized by the object recognition unit 1101 and the position of each body in the real space from the object recognition unit 1101, and generates and retains, as the 3D stereoscopic model of each body, data including the notified type, shape and size of each body and the position of each body in the real space.

Moreover, the 3D model management unit 1102 assigns a body identifier for identifying the respective bodies to the 3D stereoscopic model of each body. In other words, the 3D stereoscopic model of each body becomes data in which the body identifier of the body is linked with the data showing the type, shape and size of each body and the position of each body in the real space. Note that the 3D model management unit 1102 sends the generated 3D stereoscopic model, as the object recognition notice D1, to the function setting unit 1103.

Moreover, when a graphics superimposition request D2 designating the body identifier for superimposing graphics on the body (selected body) is supplied from the processing determination unit 1107, the 3D model management unit 1102 generates and retains the graphics generation information related to that body. Here, the graphics generation information is information which is required for generating the graphics to be superimposed and displayed on the body in a virtual-reality space. The graphics superimposition request D2 includes data showing the size, shape, and position of superimposition of the graphics. Accordingly, the 3D model management unit 1102 may generate data showing the size, shape, and position of superimposition of the graphics as the graphics generation information.

The 3D model management unit 1102 sends the generated graphics generation information, as the graphics generation request D3, to the graphics generation unit 1108.

The function setting unit 1103 retains function information in which is prescribed the functions configured from a series of operations and processing that can be set for each type of body. The function information will be explained later with reference to FIG. 3. Subsequently, the function setting unit 1103 refers to the function information when a body is recognized by the object recognition unit 1101, and sets a function to the body based on the type of recognized body. Note that the function setting unit 1103 may determine that the body indicated by the object recognition notice D1 was recognized by the object recognition unit 1101 when the object recognition notice D1 is supplied from the 3D model management unit 1102.

In addition, when the object recognition notice D1 is sent from the 3D model management unit 1102, the function setting unit 1103 refers to the function category candidate information shown in FIG. 3A, searches for the settable function category candidates based on the type of recognized body, and decides the function to be set to that body among the searched function category candidates.

Note that, in the present invention, the 3D model management unit 1102 may be omitted. In the foregoing case, the object recognition unit 1101 may assign a body identifier to the recognized body, and send the notice of the body identifier as well as the type, shape and size of the recognized body and the position of the recognized body in the real space, as the object recognition notice D1, to the function setting unit 1103. Subsequently, the function setting unit 1103 may compare the object recognition notice D1 sent from the object recognition unit 1101 and the function category candidate information shown in FIG. 3A, search for the settable function category candidate based on the type of each of the recognized bodies, and decide the function to be set to each body among the searched function category candidates.

Here, when a body is recognized by the object recognition unit 1101, the function setting unit 1103 may also present the operation and processing candidates that can be set to the type of body to the user, set the operation and processing selected by the user as the function of that body, and associate the set function with the user identifier and retain the association. In the foregoing case, all operations and processing that can be set to the recognized body are not set as the functions of the body, and only the series of operations and processing selected by the user among all operations and processing that can be set to the body are set as the functions of the body. As described above, by associating the function and the user identifier and recording the association, the function setting unit 1103 can set different functions, even when the bodies are the same, based on each user, the functions of the user's preference can be set to the respective bodies.

Here, as the timing of asking the user regarding one's preferred functions, the timing is not limited to the time that the body is recognized, and the timing may also be after the body is recognized. After the recognition of the body, the user may be asked of one's preferred functions when a function change request is input by the user.

Moreover, when a body is recognized by the object recognition unit 1101, the function setting unit 1103 may also determine the settable operations and processing based on the characteristics of the recognized body, and set the determined operation and processing as the function of the body. Here, as the characteristics, at least either the shape or the size of the recognized body may be used.

In addition, when a body is recognized by the object recognition unit 1101, the function setting unit 1103 may determine the operation and processing that can be set to the recognized body based on the capacity of the function extension device 1002 and the capability of the peripheral equipment that is connected to the function extension device 1002, and set the determined operation and processing as the function of the body.

In other words, in this embodiment, rather than setting all operations and processing that can be set to the recognized body as the functions of that body, the operations and processing that match the characteristics of the body and the performance (specification) of the function extension system 1001 may be selectively set as the functions of that body.

Moreover, when a function inquiry request D4 for making an inquiry regarding the functions set to a certain body by notifying the body identifier of that body from the processing determination unit 1107 is sent, the function setting unit 1103 refers to the function setting information (FIG. 4A) regarding the functions set to that body and specifies the functions set to that body, and sends the notice of the function correspondence information D7 (refer to FIG. 3C) corresponding to the specified functions to the processing determination unit 1107.

The input recognition unit 1104 recognizes the user's input operation and the input position, which is the position where the input operation was performed in the real space, from the information indicating the user's movement that was acquired by the user input recognition device 1004. Specifically, the input recognition unit 1104 recognizes the user's input operation and input position by acquiring the information indicating the user's hand movement that is output as information indicating the user's movement from the user input recognition device 1004. Subsequently, when the input recognition unit 1104 recognizes the user's input operation and input position, the input recognition unit 1104 sends the notice of information indicating the hand movement to the operation determination unit 1106, and sends the notice of the input position to the selection determination unit 1105. Here, as information indicating the hand movement, for example, adopted is data which arranges, in a time-series, the position data indicating the positions of the characteristics points of the user's hand in the real space.

Moreover, the input recognition unit 1104 acquires the user identifier from the user when the use of the function extension system is started by that user (for example, when the power is turned ON). Here, the input recognition unit 1104 may acquire the user identifier by authenticating the user's fingerprint or causing the user to input the user identifier. Upon authenticating the user's fingerprint, the input recognition unit 1104 associates the image data of the user's fingerprint, for which the use of the function extension system 1001 is permitted, with the user identifier, and retains the association in advance. Subsequently, the input recognition unit 1104 causes the user input recognition device 1004 to acquire the image data of the user's fingerprint at the beginning of use of the function extension system 1001. Subsequently, the input recognition unit 1104 may compare the acquired fingerprint image data and the pre-stored fingerprint image data, thereby identify the user who is using the function extension system, and acquire the user identifier of the identified user.

Moreover, when causing the user to input the user identifier, the video output device 1005 may display the graphics of a keyboard so that the user can input the user identifier through such graphics. Otherwise, the function extension system may be provided with a physical keyboard, and the user may operate this keyboard to input the user identifier. Note that the input recognition unit 1104 sends the notice of the acquired user identifier to the operation determination unit 1106.

The selection determination unit 1105 determines the selected body by that was selected by the user as the body to be operated based on the position of each body in the real space recognized by the object recognition unit 1101, and the input position in the real space recognized by the input recognition unit 1104 among the respective bodies that were recognized by the object recognition unit 1101.

Specifically, the selection determination unit 1105 recognizes the position of the respective bodies in the real space based on the body information D5 that was supplied as a result of the body information D5, which associates the position data and the body identifier of the respective bodies, being notified from the 3D model management unit 1102. Subsequently, the selection determination unit 1105 determines, as the selected body, the body that is positioned in an overlapping manner on the current input position of the user that was notified from the input recognition unit 1104. Here, when the body is positioned within a predetermined range relative to the input position, the selection determination unit 1105 may determine that body to be the selected body. Moreover, when a plurality of bodies exist within a predetermined range relative to the input position, the body that is closest to the input position may be determined as the selected body. Subsequently, the selection determination unit 1105 sends the notice of the body identifier of the selected body to the operation determination unit 1106.

Note that, when the 3D model management unit 1102 is omitted, the selection determination unit 1105 is notified of the position of each of the recognized bodies in the real space from the object recognition unit 1101. Subsequently, the selection determination unit 1105 determines the selected body that was selected by the user based on the position of each body in the real space notified from the object recognition unit 1101 and the input position notified from the input recognition unit 1104. Subsequently, the selection determination unit 1105 sends the notice of the body identifier of the selected body to the operation determination unit 1106.

The operation determination unit 1106 determines the operation that was performed by the user to the selected body based on the input operation recognized by the input recognition unit 1104. Here, the "operation" determined by the operation determination unit 1106 is, in addition to the hand coordinate information and acceleration information, operation information which gives meaning to human movement such as "trace", "hold", and "hit".

Specifically, the operation determination unit 1106 manages dictionary information which associates the information indicating the hand movement supplied from the input recognition unit 1104, and the user's "operation". Subsequently, when information indicating the hand movement is supplied from the input recognition unit 1104, the operation determination unit 1106 refers to the dictionary information, and performs processing of determining the operation which corresponds to the information indicating the hand movement. Here, the dictionary information may be registered in advance or learned from the history of the user's hand movement. Note that, as technology for determining the user's operation based on the user's hand movement, known is, for example, the gesture recognition function of NITE (Prime Sense's Natural Interface Middleware), which is prime sensor software developed by Prime Sense, and the operation determination unit 1106 may determine the user's operation by using the foregoing technology.

When the operation determination unit 1106 determines the user's operation, the operation determination unit 1106 sends, to the processing determination unit 1107, the notice of a processing request D6 which associates the user's operation, the body identifier of the selected body determined by the selection determination unit 1105, and the user identifier.

When the processing determination unit 1107 receives the processing request D6 from the operation determination unit 1106, the processing determination unit 1107 extracts the body identifier (body identifier of the selected body) and the user identifier included in the processing request D6, and sends, to the function setting unit 1103, the notice of the extracted body identifier and user identifier as the function inquiry request D4 for making an inquiry regarding the functions (pair of operation and processing) set to the selected body.

Note that the processing determination unit 1107 may also recognize the selected body as a result of causing the selection determination unit 1105 to notify the body identifier of the selected body.

When the function setting unit 1103 receives the function inquiry request D4, the function setting unit 1103 refers to the function setting information shown in FIG. 4A, specifies the functions set to the body for each user based on the body identifier and user identifier configuring the function inquiry request D4, and sends, to the processing determination unit 1107, the notice of the function correspondence information D7 (FIG. 3C) corresponding to the specified function.

Subsequently, the processing determination unit 1107 compares the function correspondence information D7 notified from the function setting unit 1103 and the user's operation indicated in the processing request D6 notified from the operation determination unit 1106, and thereby determines the processing to be executed to the selected body.

Here, when the processing determined by the processing determination unit 1107 is processing that involves the superimposition of graphics on the body, the processing determination unit 1107 sends, to the 3D model management unit 1102, the notice of the body identifier of the selected body, and a graphics superimposition request D2 designated with data indicating the size, shape, and position of superimposition of the graphics to be superimposed on the selected body.

Consequently, the processing to the body is visually fed back to the user, and an operational feeling can be provided to the user.

Moreover, when the processing determined by the processing determination unit 1107 is processing of providing a tactile sense to the user in association with the superimposition of graphics on the body, the processing determination unit 1107 sends the notice of a tactile output request D8 to the tactile output control unit 1110. Consequently, the processing performed to the body is fed back to the user both visually and tactually, and a more exciting operational feeling can be provided to the user. Thus, the user's interest in the operation can be increased.

Here, when the processing determination unit 1107 determines processing involving the superimposition of graphics, the processing determination unit 1107 sends the notice of a graphics superimposition request D2 to the 3D model management unit 1102 in the foregoing explanation. However, when the 3D model management unit 1102 is omitted, the graphics superimposition request D2 may be sent to the graphics generation unit 1108.

In the foregoing case, the graphics generation unit 1108 generates graphics to be superimposed on the selected body based on the information prescribed in the graphics superimposition request D2. Subsequently, the graphics generation unit 1108 may acquire the position data of the selected body in the video data from the 3D model management unit 1102, and output a drawing request D9 to the video output control unit 1109.

Moreover, in the present invention, the graphics generation unit 1108 may also be omitted in addition to the 3D model management unit 1102. In the foregoing case, the processing determination unit 1107 may generate graphics to be superimposed on the selected body, output, to the video output control unit 1109, the data associating the generated graphics and the position of superimposition in the video data as the drawing request D9, and thereby superimpose the graphics on the selected body.

The graphics generation unit 1108 generates graphics to be superimposed on the body managed by the 3D model management unit 1102. Specifically, when the graphics generation unit 1108 receives a graphics generation request D3 from the 3D model management unit 1102, the graphics generation unit 1108 generates graphics according to the graphics generation information included in the graphics generation request D3. Here, the graphics generation unit 1108 outputs, to the video output control unit 1109, a drawing request D9 for, for example, displaying graphics generated at a position of the selected body in the video data prescribed in the graphics generation information.

Note that, in the present invention, the graphics generation unit 1108 may be omitted. In the foregoing case, the processing determination unit 1107 may generate the graphics to be superimposed on the selected body included in the video data, and output, to the video output control unit 1109, the drawing request D9 for displaying the generated graphics on the position of the selected body in the video data.

When the processing determined by the processing determination unit 1107 is processing that involves the superimposition of graphics on the selected body, the video output control unit 1109 sends, to the video output device 1005, video data in which the graphics generated by the graphics generation unit 1108 are superimposed on the selected body displayed in the video data acquired by the video input device 1003.

Moreover, when the processing determined by the processing determination unit 1107 is processing that does not involve the superimposition of graphics on the selected body, the video output control unit 1109 sends the video data acquired by the video input device 1003 to the video output device 1005 without superimposing graphics on such video data.

The tactile output control unit 1110 operates the tactile output device 1006 according to the tactile output request D8 notified from the processing determination unit 1107. As the tactile output request D8, for example, an electronic signal for driving the tactile output device 1006 is adopted, and this electronic signal is supplied for a predetermined time to the tactile output device 1006, and the tactile output device 1006 is driven for a predetermined time and provides a tactile sense to the user.

The respective configurations of the function extension device 1002 were explained above.

The video input device 1003 captures, for example, the video of the real space at a predetermined frame rate, acquires the real-space video data, and sequentially supplies the acquired video data to the function extension device 1002. Here, as the video input device 1003, used may be, for example, a 3D camera, a depth sensor, or the like.

The user input recognition device 1004 acquires the information indicating the user's movement, and sends the acquired information to the function extension device 1002. The devices for recognizing the user's movement are broadly classified into a 3D position estimation device which recognizes the user's hand movement, a device which recognizes the movement of the user's line of sight, a device which recognizes the user's audio (language) input, a device which recognizes the user's brainwaves, and a device which recognizes the user's position information.

As the 3D position estimation device, for example, used may be a depth sensor, an infrared sensor, a magnetic sensor, an ultrasonic sensor, a stereo camera, an acceleration sensor, and so on. As the depth sensor, for example, used may be D-IMager (registered trademark) of Panasonic, KINECT (registered trademark) of Microsoft, and Prime Sensor of Prime Sense.

As the acceleration sensor, used may be the Wii Remote (registered trademark) of Nintendo. Moreover, as the device which recognizes the user's position information, used may be a GPS.

In this embodiment, as the user input recognition device 1004, any device among the following may be adopted; namely, a 3D position estimation device, a device which recognizes the movement of the user's line of sight, a device which recognizes the user's audio (language) input, a device which recognizes the user's brainwaves, and a device which recognizes the user's position information, but in the ensuing explanation, a depth sensor or a 3D camera is used as the user input recognition device 1004 for explaining a case of recognizing the user's hand movement as an example of the user's movement. Note that, in FIG. 1, while the video input device 1003 and the user input recognition device 1004 are indicated as separate blocks, when the video input device 1003 and the user input recognition device 1004 are configured from a depth sensor or a 3D camera, both blocks may be configured from the same depth sensor or 3D camera.

The video output device 1005 outputs the video that was created by the function extension device 1002. In this embodiment, for example, a head-mount display is adopted as the video output device 1005.

The tactile output device 1006 receives instructions from the tactile output control unit 1110, and provides a tactile sense to the user. Specifically, the tactile output device 1006 converts the electrical signals output from the tactile output control unit 1110 into a physical representation that can be felt by the user. Here, as the physical representation, for example, adopted is vibration. In the foregoing case, a vibrator to be worn on the user's body may be adopted as the tactile output device 1006. As the location of wearing the vibrator, for example, the user's fingertip, user's waist and the like may be considered, but any location where the user can experience a tactile sense may be adopted. Accordingly, by the using wearing a vibrator as the tactile output device 1006, it is possible to reliably provide a tactile sense to the user who will move wearing the HMD.

Note that the physical phenomenon to be provided to the user in association with the superimposition of graphics is not limited to a tactile sense and, for example, audio may also be adopted. In the foregoing case, earphones may be worn on the user's ears, and, when the processing to the selected body is executed, the processing determination unit 1107 may output audio signals explaining the execution of processing to the earphones, and output sound from the earphones.

The storage device 1007 is configured, for example, from a nonvolatile storage device, and stores the functions (pairs of operation and processing) set to the body by the function setting unit 1103 and the data determined by the processing determination unit 1107.

FIGS. 2 are diagrams schematically showing the function extension system 1001 illustrated in FIG. 1 recognizing a body in a real space, the processing of setting functions according to the type of that body, and an example of the processing that uses the set functions.

An extended real space is a virtual space that is recognized by a user through an output device such as a head-mount display. When the user does not wear a head-mount display, the user can recognize a real space, and when the user wears a head-mount display, the user recognize an extended real space.

FIG. 2A is a diagram schematically showing an example of the processing of recognizing a body in a real space as an object, and setting a function to the body that was recognized as an object. The drawing within the left frame of FIG. 2A shows a real space 2001. Within the real space 2001, for example, six bodies 2001a to 2001f exist.

The drawing within the right frame of FIG. 2A shows an extended real space 2002. In the example of FIG. 2A, the bodies 2001a, 2001d, 2001e in the real space 2001 are recognized as an object, and the bodies 2001a, 2001d, 2001e that were recognized as an object are incorporated into the extended real space 2002 and functions are respectively set thereto. The term "object recognition" refers to the function extension device 1002 recognizing bodies appearing in the video data acquired by the video input device 1003.

In this embodiment, for example, suitable functions are to that body based on results from inquiries made to the user regarding the type and size of the body. For example, since the body 2001a is a type of a "book", "read history recording function" is set in the extended real space 2002.

Moreover, since the body 2001d is a type of a "can", "color change function" is set in the extended real space 2002. In the foregoing case, graphics are superimposed and displayed on the can such that, for example, the can is blue before being opened by the user and the can is red after being opened by the user.

Moreover, since the body 2001e is a type of "globe", "search function" is set in the extended real space 2002. In the foregoing case, when the user touches a certain place on the globe, information regarding that location is displayed in the extended real space 2002.

FIG. 2B is a diagram schematically showing an example of the processing of using the functions set to the body that was recognized as an object. The drawing within the left frame of FIG. 2B shows a real space 2101 and the drawing within the right frame of FIG. 2B shows an extended real space 2102.

As shown in the extended real space 2102 depicted on the right side of FIG. 2B, visual effects are provided for visually showing the user that functions have been set to the bodies body 2001a, 2001d, 2001e to which functions are set. Accordingly, when visual effects are provided to a body, the user can recognize that a function is set to that body, and then use that function.

In the example of FIG. 2B, functions are set to the bodies 2001a, 2001d, 2001e, and the brightness of the bodies 2001a, 2001d, 2001e is set higher than the brightness of the real space 2101 so that the user can visually recognize such fact.

Note that the processing performed by the function extension device 1002 of this embodiment for recognizing a body in a real world and setting a function that suits that body, and the processing of using the function set to the body are not limited to the foregoing example.

FIGS. 3 are diagrams schematically showing an example of the function information retained by the function setting unit 1103. In the examples of FIGS. 3, the function information has a three-layer hierarchical structure configured, in order from the upper layer, "function category candidate information" shown in FIG. 3A, "function list information" shown in FIG. 3B, and "function correspondence information" shown in FIG. 3C.

The "function category candidate information" retains the function category candidates that can be set for each type of body. The "function list information" retains a list of the functions comprising the respective function categories. The "function correspondence information" retains the pair of operation and processing prescribed for each of the functions shown in FIG. 3B.

The function category candidate information shown in FIG. 3A includes columns 3001 to 3004. The column 3001 stores the identifier of the function category. The column 3002 stores the function category. The column 3003 stores the type of body that can be set to each function category. The column 3004 stores a pointer for referring to the function list information corresponding to each function category.

The function list information shown in FIG. 3B is the function list information of the function category of "record write history" stored in the row 3011 of FIG. 3A. In the example of FIG. 3B, the function list information includes columns 3101 to 3103 and rows 3111 to 3113.

The column 3101 stores the identifier of the function. The column 3102 stores information showing whether each function is a default function or a customized function. Here, the default function is a function that is pre-set to the body corresponding to the body type indicated in column 3003.

The customized functions 1, 2 are configured from a pair of operation and processing that is different from the operation and processing selected by the user who is using the function extension system 1001, the operation and processing that were set by being determined as suitable for the characteristics (shape and size) of the body, or the default function of operation and processing that can be elected from the performance of the device configuring the function extension system 1001. The column 3103 stores a pointer for referring to the function correspondence information corresponding to each function.

The function correspondence information shown in FIG. 3C prescribes pairs of operation and processing configuring the respective functions listed in the function list information of FIG. 3B.

In the example of FIG. 3C, shown is the function correspondence information prescribing the pair of series of operations and processing configuring the default function in which the function category shown in FIG. 3A is "recording write history". The function correspondence information includes columns 3201 and 3202. The column 3201 stores information prescribing the operations performed by the user. The column 3202 stores the contents of processing corresponding to the respective operations.

For example, when the object recognition unit 1101 recognizes a body in which the type is "book", the function setting unit 1103 refers to the function category candidate information of FIG. 3A, and determines that "record write history" having an identifier of "A" and "display type" having an identifier of "T" can be set as the functions to a "book".

As shown in the function list information of FIG. 3B, with respect to "record write history", "default function" having an identifier of "A-a", "customized function 1" having an identifier of "A-b" and "customized function 2" having an identifier of "A-c" can be selected. Here, is there is no specific designation, "default function" is selected, and the operation and processing indicated in the function correspondence information of FIG. 3C are set as the function of the body of "book".

Subsequently, when the operation determination unit 1106 recognizes that the operation of "trace" was input by the user, the processing determination unit 1107 refers to the function correspondence information shown in FIG. 3C, and determines the processing of "underline" as the processing corresponding to the operation of "trace". Consequently, the graphics generation unit 1108 generates graphics that underline the portion that was traced by the user are generated on the book in the extended real space, and the video output device 1005 superimposed and displays the underline graphics on the book in the extended real space. Consequently, the user can underline a book in the extended real space.

FIG. 4A is a diagram showing an example of the function setting information showing the functions that were set by the function setting unit 1103 to the respective bodies that were recognized as an object by the object recognition unit 1101. The function setting information associates the body that was recognized as an object and incorporated into the extended real space, and the function that was set to that body, and stores the association.

The function setting information comprises columns 4001 to 4005. The column 4001 stores a body identifier "Object ID" of the body that was recognized as an object. The column 4002 stores the type of each body that was recognized as an object. The column 4003 stores the identifier of the function category set to each body that was recognized as an object. The column 4004 stores the identifier of the functions set to each body that was recognized as an object. Here, for simplification, an identifier having "-a" after the hyphen indicates a default function, and an identifier having "-b" after the hyphen indicates a customized function. The column 4005 stores the user identifier indicating to which user the functions set to each body that was recognized as an object recognition relate.

Rows 4011 to 4018 respectively indicate the record corresponding to each body that was recognized as an object recognition. Here, even when the bodies are the same, the rows are sorted for each user if a plurality of users have set different functions.

FIG. 4B is a diagram schematically showing an example of the functions set by the function extension device 1002 according to an embodiment of the present invention to the bodies that were recognized as an object.

The diagram within the frame indicated in FIG. 4B shows the bodies that were recognized as an object in the extended real space 4101. Bodies 2001*a* to 2001*f* are the bodies included in the video data acquired by the video input device 1003. The bodies 2001*a* to 2001*f* are recognized as an object, and are assigned body identifiers (Object IDs) ID1 to ID6.

The body 2001*a* is a body having an Object ID of "ID1" and in which the type is a "book". In addition, the body 2001*a* is set with a function of, for example, "record write history" in the extended real space 4101. The body 2001*d* is a body having an Object ID of "ID5" and in which the type is a "can". In addition, the body 2001*d* is set with, for example, "color change function" in the extended real space 4101. The body 2001*e* is a body having an Object ID of "ID6" and in which the type is a "globe". In addition, the body 2001*e* is set with, for example, "search function" in the extended real space 4101.

The processing of the function extension system 1001 setting a function to the body that was recognized as an object is not limited to the foregoing example. Moreover, the processing of setting the functions will be described later with reference to the flowchart of FIG. 6.

Figure 5:
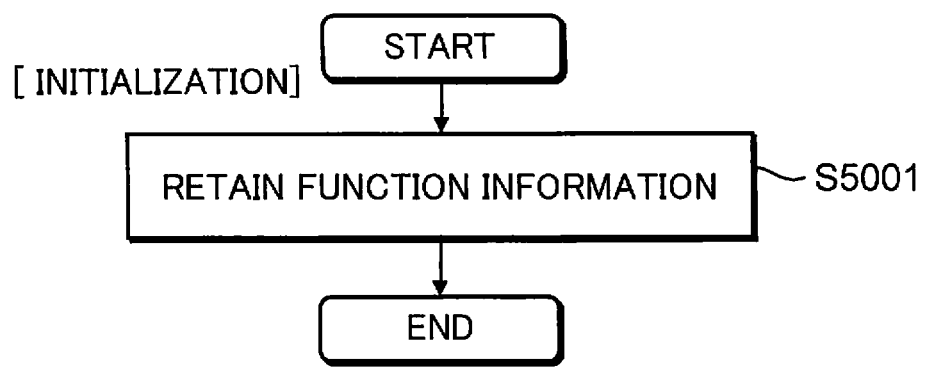
FIG. 5 is a flowchart showing an example of the initialization processing that is implemented by the function extension device according to an embodiment of the present invention.

FIG. 5 is a flowchart showing an example of the initialization processing that is implemented by the function extension device 1002 according to an embodiment of the present invention. Foremost, the function setting unit 1103 retains the function information, which was prepared in advance, shown in FIGS. 3 (S5001). Here, the function information is pre-stored in the storage device 1007 and, for example, when the power of the function extension device 1002 is turned ON, the function setting unit 1103 reads the function information from the storage device 1007, and retains the function information by storing it in a RAM or the like not shown.

Note that the function setting unit 1103 may also incorporate, into the function extension device 1002, the latest function information from a server that is connected via a communication network. In the foregoing case, the communication unit 1008 of the function extension device 1002 shown in FIG. 1 may be used. The communication unit 1008 is configured from a communication device for connecting the function extension device 1002 to the communication network NT. As the communication network NT, for example, the internet is used.

The server 1009 (example of the external determination device) retains, for example, the latest function information held by the administrator managing the function extension system 1001 and which is created by the operator as needed. Subsequently, when the power of the function extension device 1002 is turned ON, the function extension device 1002 sends a function information load request to the server 1009. When the server 1009 receives the function information load request, the server 1009 sends the latest function information to the function extension system 1001 that sent the function load request. When the communication unit 1008 receives the function information, the communication unit 1008 supplies the received function information to the function setting unit 1103.

Consequently, the function setting unit 1103 can set functions to the body that was recognized as an object by using the latest function information at all times. Thus, it is possible to prevent unwanted functions from being set to the body that was recognized as an object.

Figure 6:
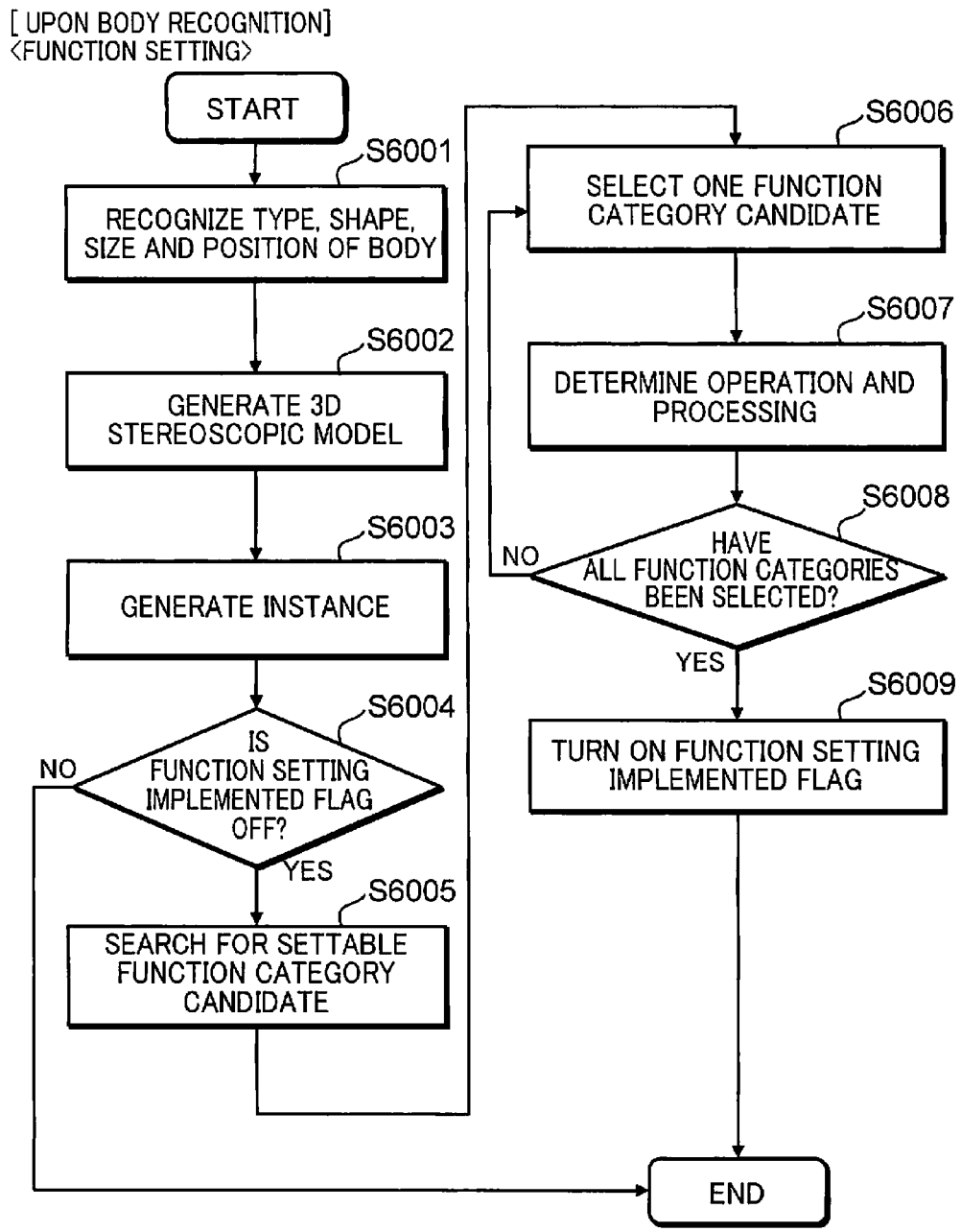
FIG. 6 is a flowchart showing the function extension device according to an embodiment of the present invention recognizing a body as an object, and an example of the processing of setting functions to the body that was recognized as an object.

FIG. 6 is a flowchart showing the function extension device 1002 according to an embodiment of the present invention recognizing a body as an object, and an example of the processing of setting functions to the body that was recognized as an object.

Foremost, the object recognition unit 1101 recognizes a body included in the real-space video data acquired from the video input device 1003, and notifies the 3D model management unit 1102 of the type, shape and size of the recognized body and the position of the recognized body in the real space (S6001). Note that, when the 3D model management unit 1102 is omitted, the object recognition unit 1101 may assign a body identifier to the recognized body, and notify the function setting unit 1103 of the body identifier as well as the type, shape and size of each of the recognized bodies and the position of each of the recognized bodies in the real space, as an object recognition notice D1.

Here, as data indicating the shape of the body, for example, data indicating the arrangement pattern of the characteristics points of the body may be adopted. Moreover, as data indicating the size of the body, the area within the outline form of the body may be adopted. Moreover, as the position in the real space, the 3-dimensional data indicating the position of the body when using the function extension system 1001 as the reference may be adopted.

The 3D model management unit 1102 assigns a body identifier to the type, shape, size, and position of the body recognized by the object recognition unit 1101, and generates a 3D stereoscopic model for each body (S6002). Subsequently, the 3D model management unit 1102 retains each of the generated 3D stereoscopic models, and notifies the function setting unit 1103 of theses as the object recognition notice D1.

Note that, when the 3D model management unit 1102 is omitted, the object recognition unit 1101 may notify the function setting unit 1103 of object recognition notice D1.

Subsequently, when there is no instance of a body class corresponding to the recognized body, the function setting unit 1103 generates and stores an instance of the body class (S6003).

Here, a body class is a class in which the "body identifier", "type", "set function", "user who set the function", and "function setting implemented flag" of the recognized body are defined. Moreover, an instance is an instance which prescribes the "body identifier", "type", "set function", "user who set the function", and "function setting implemented flag" of each of the recognized bodies.

Subsequently, the function setting unit 1103 determines whether the "function setting implemented flag" of the instance is OFF or ON (S6004).

In S6004, when there is an instance where the "function setting implemented flag" is OFF (S6004; YES); that is, when there is a body to which a function has not yet been set, the function setting unit 1103 refers to the function category candidate information shown in FIG. 3A, and searches for a function category candidate that can be set to the body from the type of recognized body (S6005). In the example of FIG. 3A, the function category candidate that can be set to the body, in which the type is a book, are "record write history" having the identifier of "A" and "display type" having the identifier of "T".

Meanwhile, in S6004, when the "function setting implemented flag" of all instances is ON (S6004; NO); that is, when functions have been set to all bodies, the processing is ended.

Subsequently, the function setting unit 1103 selects one function category candidate among the settable function category candidates that were searched (S6006). In the example of FIG. 3A, the function category candidate that can be set to the body, in which the type is a book, are "record write history" and "display type". Thus, the function setting unit 1103 selects, in order, the function category candidates shown in FIG. 3A from the top such as by foremost selecting "record write history" stored in the upper row, and subsequently selecting the "display type".

Subsequently, the function setting unit 1103 determines whether any operation and processing among the series of operations and processing defined in the selected function category will be set to the corresponding body (S6007).

Three examples of methods for the function setting unit 1103 to determine the operation and processing are described below.

(Method 1)

Method 1 is a method of determining the operation and function that suit the body from the shape and size of the recognized body and the specification of the function extension system 1001.

Specifically, the following (Example 1-a) to (Example 1-d) may be adopted.

EXAMPLE 1-a

The function setting unit 1103 determines whether to set the operation of "write" as a function according to whether the operation determination unit 1106 has a function of recognizing characters. For example, there may be cases where the operation determination unit 1106 can recognize the user's movement of "trace" but does not have the function of recognizing the characters that were input by the user based on the recognized "trace" movement. In the foregoing case, it would be meaningless to set the operation of "write" shown in FIG. 3C as a function. Thus, the function setting unit 1103 does not set the operation of "write" as a function when the operation determination unit 1106 does not have a character recognition function.

For example, with a body in which the type is a book, the function setting unit 1103 performs the following processing. Foremost, the function setting unit 1103 refers to the function correspondence information (FIG. 3C) corresponding to the default function of "record write history". Subsequently, when the function setting unit 1103 decides to omit the operation of "write", the function setting unit 1103 deletes the row 3214 which prescribes the operation and processing of "write" from the function correspondence information of the default functions. In addition, the function setting unit 1103 generates the function correspondence information that was deleted from the row 3214 as a customized function 1, and associates the customized function 1 with the book. Specifically, the function setting unit 1103 assigns an identifier "A-b" to the customized function 1 and generates and stores the function correspondence information of the customized function 1, and writes an identifier "A-b" into the "set function" of the instance of the instance. Consequently, the series of operations and processing prescribed by the function correspondence information of the customized function 1 are set as the function of the book.

EXAMPLE 1-b

The function setting unit 1103 determines, based on the size of the body, whether to set the processing of the "enter character" shown in FIG. 3C as a function. For example, when the body recognized by the object recognition unit 1101 is a book, while the user will write characters in a big book, the user will not write characters in a small book. In the foregoing case, the function setting unit 1103 does not set the processing of "enter character" to a body when the size of the body is smaller than a prescribed value.

For example, with a body in which the type is a book, the function setting unit 1103 performs the following processing. Foremost, the function setting unit 1103 refers to the function correspondence information (FIG. 3C) corresponding to the default function of "record write history". In addition, when the function setting unit 1103 decides to omit the processing of "enter character", the function setting unit 1103 deletes the row 3214 which prescribes the operation and processing of "enter character" from the function correspondence information of the default functions. In addition, the function setting unit 1103 generates the function correspondence information that was deleted from the row 3214 as a customized function 1, and associates the customized function 1 with the book.

EXAMPLE 1-c

The function setting unit 1103 determines whether to set "record write history" as a function based on the capacity of the storage device 1007 and the existence/non-existence of an access restriction function. For example, when the capacity of the storage device 1007 is small or access of the storage device 1007 is limited, the storage device 1007 cannot record the write history of the user. In the foregoing case, it would be meaningless to set "record write history" as a function of the body.

Thus, the function setting unit 1103 does not set "record write history" as a function when the capacity of the storage device 1007 is smaller than a prescribed value or when the storage device 1007 is set with an access restriction.

For example, when the function setting unit 1103 determines not to set the function of "record write history" to a book in a body, in which the type is a book, the function setting unit 1103 does not associate an identifier "A" of "record write history" with the body identifier of the book. Consequently, no operation and processing in which "record write history" is prescribed are set to the book.

EXAMPLE 1-d

For example, let it be assumed that the body is a chair. As chairs, there is a rotating-type chair and a fixed-type chair. The shape of a fixed-type chair is generally formed from four legs. The rotating-type chair is generally formed from one leg. The user will not perform the operation of "rotate" to a fixed-type chair. In the foregoing case, it would be meaningless to set the operation of "rotate" as a function to a fixed-type chair.

Thus, the function setting unit 1103 does not set the operation and processing of "rotate" to a chair when the body recognized by the object recognition unit 1101 is a chair and the shape of that chair has four legs.

For example, let it be that the operation and processing of "rotate" are prescribed in the function correspondence information indicating the default functions shown in FIG. 3C. In the foregoing case, the function setting unit 1103 generates, as the customized function 1, the result of deleting the row which prescribes the operation and processing of "rotate" from the function correspondence information to a body in which the type is a chair and the shape of that chair has four legs. Subsequently, the function setting unit 1103 associates the identifier of the generated customized function 1 with the body identifier of the chair.

(Method 2)

Method 2 is a method of setting a function to each body recognized by the administrator who is administrating the function extension system 1001. Specifically, the function setting unit 1103 requests the server 1009 to perform the determination processing of determining the operation and processing that can be set to each of the recognized bodies. Consequently, the server 1009 determines the operation and processing that can be set to the bodies for which the determination processing was requested, and sends the determination result including the determined operation and processing to the function extension system 1001. Note that the administrator may be the manufacturer of the function extension system 1001, the provider providing the application to the function extension system 1001, or the service provider providing management services of the function extension system 1001.

Subsequently, the function setting unit 1103 sets the operation and processing indicated in the determination result of the server 1009 as the function to the body for which the determination request was made.

Here, the server 1009 performs the determination processing according to the same method as Method 1 described above. In other words, the server 1009 retains the function information shown in FIG. 3 and, upon receiving a determination request, refers to the function information, and determines the operation and processing of the body for which the determination request was made. Here, the determination request includes the body identifier, shape, size, equipment information, and so on. Subsequently, the server 1009 may determine the operation and processing based on the body identifier, shape, size, and equipment information included in the determination request. Note that, as the equipment information, included is information on whether the operation determination unit 1106 has a character recognition function, as well as information on the storage capacity and so on of the storage device 1007.

(Method 3)

Method 3 is a method of presenting the settable operations and processing to the user, and allowing the user to select the desired operation and processing among the presented operations and processing. Specifically, when the type of body is recognized as a book by the object recognition unit 1101, the function setting unit 1103 presents the operations and processing (FIG. 3C) prescribed in the function correspondence information corresponding to the default functions to the user.

In the foregoing case, the function setting unit 1103 may send a display request to the graphics generation unit 1108 for displaying the operation and processing shown in FIG. 3C, and display graphics as a list of the operations and processing shown in FIG. 3C on the video output device 1005.

The user inputs, to the user input recognition device 1004, a selection command of selecting the desired operation and processing among the operations and processing displayed as a list on the video output device 1005. Consequently, the function setting unit 1103 generates, as a customized function 1, the function correspondence information configured from the operation and processing selected by the user, and associates the customized function 1 and the user identifier of the user who selected the operation and processing with the book.

Here, there may also be cases where a different user selects the operation and processing to be performed to a body (body with the same body identifier) that is the same as the body to which the customized function 1 was previously associated by a certain user. In the foregoing case, the function setting unit 1103 may generate, as a customized function 2, the function correspondence information configured from the operation and processing selected by the different user, and associate the user identifier of the different user and the customized function 2 with the body. Consequently, it is possible to set functions to a body, based on the user, even when the bodies are the same. Accordingly, functions that suit the respective bodies can be set.

Returning to FIG. 6, the function setting unit 1103 determines whether all settable function category candidates have been selected (S6008). Subsequently, when all settable function categories have been selected (S6008; YES), the function setting unit 1103 sets the function that was determined to be set as the instance of the body class, and sets the "function setting implemented flag" to ON (S6009). Meanwhile, when all settable function categories have not been set (S6008; NO), the function setting unit 1103 returns the processing to S6006, and continues with the processing.

In other words, the function setting unit 1103 repeats the processing of S6006 to S6008 until the "function implemented flag" of the instance of all recognized bodies is turned ON, and then ends the processing.

For example, for a book, "record write history" is foremost selected in FIG. 3A. Subsequently, when the function correspondence information is generated regarding "record write history" based on one method among method 1 to method 3, "display type" is subsequently selected, and the function correspondence information is generated regarding "display type" based on one method among method 1 to method 3. Note that, in FIGS. 3, while the function correspondence information corresponding to "display type" is not shown, when the function correspondence information of the default functions shown in FIG. 3C is available, the function setting unit 1103 may generate the function correspondence information by using such function correspondence information of the default functions.

FIG. 7 is a flowchart showing the function extension device 1002 according to an embodiment of the present invention recognizing the user's operation, and an example of the processing to be implemented upon executing the functions that were set to the body.

The input recognition unit 1104 recognizes the user's input operation and input position from the information indicated by the user's hand movement acquired by the user input recognition device 1004, notifies the selection determination unit 1105 of the input position, and notifies the operation determination unit 1106 of the information indicating the hand movement (S7001).

Subsequently, the selection determination unit 1105 determines the selected body that was selected by the user from the input position notified by the input recognition unit 1104 and the body information D5 notified by the 3D model management unit 1102 (S7002).

Subsequently, the operation determination unit 1106 determines the user's operation from the user's hand movement notified by the input recognition unit 1104 (S7003).

Subsequently, the processing determination unit 1107 sends the notice of a function inquiry request D4 to the function setting unit 1103 for making an inquiry on the functions set to the selected body (S7004), and acquires the functions set to the body.

Specifically, the function setting unit 1103 foremost refers to the function setting information shown in FIG. 4, and specifies the functions that are set to the selected body. For example, let it be assumed that the body identifier included in the function inquiry request D4 is "ID1", and the user who is currently using the function selection system is Mr. A. In the foregoing case, the function setting unit 1103 refers to the row 4011 shown in FIG. 4. Consequently, "A-a" is stored as the identifier of the function in the column 4004 of the row 4011. In other words, the detailed function of "record write history" has been set to the book pertaining to the function inquiry request D4.

Thus, the function setting unit 1103 notifies the processing determination unit 1107 of the function correspondence information (refer to FIG. 3C) corresponding to the identifier "A-a" of the function. Consequently, the processing determination unit 1107 acquires the functions set to the book as the selected body.

Subsequently, the processing determination unit 1107 refers to the acquired function, and determines the processing corresponding to the operation determined by the operation determination unit 1106 (S7005). For example, if the operation input by the user is "trace", the processing determination unit 1107 refers to the function correspondence information shown in FIG. 3C, and determines the processing of "underline" corresponding to the operation of "trace".

Subsequently, the processing determination unit 1107 determines whether the determined processing involves the superimposition of graphics (S7006). Here, whether the processing involves the superimposition of graphics superimpose may be determined from the determined processing contents. For example, in the example of FIG. 3C, the processing of "display up to previous write history", "underline" and "enter character" is processing that involves the superimposition of graphics. Accordingly, when the determined processing corresponding to the foregoing processing, the processing determination unit 1107 determines that the processing involves the superimposition of graphics.

Subsequently, when the determined processing involves the superimposition of graphics (S7006; YES), the processing determination unit 1107 notifies the 3D model management unit 1102 of the graphics superimposition request D2 including the size, shape, and position of superimposition (S7007).

Subsequently, the 3D model management unit 1102 generates the notified graphics superimposition request D2 as the graphics generation information, and sends the graphics generation information, as the graphics generation request D3, to the graphics generation unit 1108 (S7008).

Subsequently, the graphics generation unit 1108 generates graphics according to the graphics generation request D3 (S7009), and sends the notice of the drawing request D9 to the video output control unit 1109. Subsequently, the video output control unit 1109 superimposes the graphics generated by the graphics generation unit 1108 on the selected body displayed on the video data according to the drawing request D9 (S7010), and supplies the result to the video output device 1005. In S7006, when the processing does not involve the superimposition of graphics (S7006; NO), the processing proceeds to S7011.

Note that, when the 3D model management unit 1102 and the graphics generation unit 1108 are omitted, in S7007 to S7009, the processing determination unit 1107 may generate the graphics to be superimposed on the selected body, and send the notice of the drawing request D9 indicating the generated graphics and the position of superimposition to the video output control unit 1109.

Subsequently, the processing determination unit 1107 determines whether the determined processing includes a record of the operation/usage status (S7011). When it is determined that the determined processing includes a record of the operation/usage status (S7011; YES), the processing determination unit 1107 records the operation/usage status in the storage device 1007 (S7012), and ends the processing. Here, as the processing which includes a record of the operation/usage status, for example, there is the processing of "start record write history" and "end record write history" shown in FIG. 3C.

When the processing determination unit 1107 determines the processing of "start record write history", the processing determination unit 1107 starts recording the characters input by the user. Subsequently, each time characters are input by the user, such characters are stored in the storage device 1007. Subsequently, when the processing determination unit 1107 determines the processing of "end record write history", the processing determination unit 1107 ends the storage of characters in the storage device 1007.

Meanwhile, when the determined processing does not include a record of the operation/usage status (S7011; NO), the processing of S7012 is ignored and the processing is ended.

As described above, according to the function extension device 1002 in this embodiment, rather than setting a fixed function to a body that was recognized as an object, a function that suits the type of that body is dynamically set.

Thus, functions can be set to the body without having to individually set functions to each body. Accordingly, even when the user moves a body to a real space where no functions have been set, functions can be set to that body.

Note that all blocks shown in FIG. 1 may be mounted on a head-mount display, or certain blocks may be mounted on a head-mount display and the remaining blocks may be configured from an integrated circuit or a like and externally attached to the head-mount display.

Moreover, the processing routine of the function extension device according to the foregoing embodiments of the present invention may also be realized by the function extension program, which is stored in a storage device (ROM, RAM, hard disk or the like), capable of executing the foregoing processing routine being interpreted and executed by the CPU. In the foregoing case, the function extension program may be introduced into the storage device via a storage medium, or directly executed from the storage medium. Note that a storage medium refers to a ROM, a RAM, semiconductor memories such as a flash memory, magnetic disk memories such as a flexible disk and a hard disk, optical disc memories such as a CD-ROM, a DVD and a BD, a memory card, and so on. Moreover, a storage medium is a concept that includes communication mediums such as phone lines and transfer paths.

Moreover, the respective configurations of the function extension device according to the foregoing embodiments of the present invention can respectively be realized as an LSI, which is an integrated circuit. The configurations may individually be formed into a single chip, or all or a part of the configurations may be formed into a single chip. Here, while the integrated circuit is referred to as an "LSI", depending on the degree of integration, terms such as IC, system LSI, super LSI, and ultra LSI are also used.

Moreover, the method of forming an integrated circuit is not limited to LSI, and this may also be realized via a dedicated circuit or a general-use processor. After manufacturing the LSI, it is also possible to use a programmable FPGA (Field Programmable Gate Array) or a reconfigurable processor capable of reconfiguring the connection and setting of the circuit cells in the LSI. Furthermore, if technology capable of forming an integrated circuit, which will serve as a substitute for LSI, emerges in the future based on different technology as an advancement or derivation from the existing semiconductor technology, it goes without saying that such technology may also be used for the integration of the functional blocks. It may also be possible to apply the present invention to adaptation examples of bio technology.

The technical features of the foregoing function extension device can be summarized as follows.

(1) The function extension device of the present invention is a function extension device for incorporating a body in a real space into an extended real space, and setting a function to the body, this device including: an object recognition unit which recognizes, from real-space video data acquired by a video input device, a body included in the video data, and recognizes a type of recognized body and a position of the recognized body in the real space; a function setting unit which retains function information in which is prescribed a function configured from a pair of operation and processing that can be set for each type of body, refers to the function information when a body is recognized by the object recognition unit, and sets a function to the recognized body based on the type of recognized body; an input recognition unit which recognizes an input operation performed by a user in the real space and an input position in the real space where the input operation has been performed; a selection determination unit which determines a selected body selected by the user as a body to be operated based on the position of the body in the real space recognized by the object recognition unit and the input position in the real position recognized by the input recognition unit; an operation determination unit which determines the operation of the user by using the input operation recognized by the input recognition unit; a processing determination unit which determines the processing for the operation that has been determined by the operation determination unit among the operations configuring the function set by the function setting unit to the selected body selected by the selection determination unit; and an execution unit which executes the processing determined by the processing determination unit.

According to the foregoing configuration, function information in which is prescribed a function configured from a pair of operation and processing that can be set for each type of body is retained in advance. In addition, when, from real-space video data acquired by a video input device, each body included in the video data is recognized, the function information is referred to, and a function is set to each recognized body with the type of each body as the index.

Subsequently, when the user performs an input operation, the performed input operation and the input position in the real space where the input operation was performed are recognized. In addition, a selected body that was selected by the user as the body to be operated is determined based on the position of each recognized body in the real space and the recognized input position. Furthermore, the operation of the user is determined from the input operation, the processing which corresponds to that operation is determined, and the determined processing is executed to the selected body.

Accordingly, a function that suits the recognized body can be set dynamically to that body. Thus, a function can be set to each body without having to pre-set functions to each body.

(2) Preferably, the object recognition unit identifies, for each recognized body, the type of recognized body, and the function setting unit sets a function to each body even when the bodies are of the same type.

For example, even if the type is the same, if the exact same function is set to bodies of different sizes and performance, there may be cases where unwanted functions are set to the body. Thus, by setting functions individually to each body even when the bodies are of the same type, it is possible to reliably prevent the unwanted functions from being set to the body.

(3) Preferably, the input recognition unit acquires a user identifier for identifying a user who has performed an input operation, when a body is recognized by the object recognition unit, the function setting unit presents to a user candidates of operation and processing that can be set to the type of body, sets the operation and processing selected by the user as the function of the body, and associates the set function with the user identifier and retains the same, and the processing determination unit determines the processing for the operation determined by the operation determination unit among the operations configuring the function set to the user about which the function setting unit holds the user identifier.

According to the foregoing configuration, functions can be set based on the user according to the user's preference, even to the same body.

(4) Preferably, when a body is recognized by the object recognition unit, the function setting unit determines the operation and processing that can be set to the body among the operations and processing that can be set to the type of body, and sets the determined operation and processing as the function of the body.

According to the foregoing configuration, the operation and processing which are suitable based on body can be set as a function among the series of operations and processing that are set forth based on the type of body, and even more suitable functions can be set to each body.

(5) Preferably, the object recognition unit recognizes a shape and a size of a body, and the function setting unit determines the operation and processing that can be set to the body based on at least one of the shape and the size of the body recognized by the object recognition unit.

According to the foregoing configuration, it is possible to set a function configured from the operation and processing that suit the body based on at lease either the shape or the size of the body.

(6) Preferably, the function setting unit determines the operation and processing that can be set to the body recognized by the object recognition unit based on a capability of the function extension device and a capability of a peripheral device connected to the function extension device.

According to the foregoing configuration, it is possible to set, to a body, a function configured from executable operation and processing based on the capability of the function extension device and the capability of the peripheral device.

(7) Preferably, when the function setting unit is connected to an external determination device via a predetermined communication network when a body is recognized by the object recognition unit, the function setting unit requests the external determination device to perform determination processing for determining the operation and processing that can be set to the body among the operations and processing that can be set to the type of the body, and sets the function to the body according to a determination result of the external determination device.

According to the foregoing configuration, since the external determination device determines the operation and processing of each body, the processing load of the function extension device can be alleviated.

(8) Preferably, the function setting unit acquires the function information from a server connected via a predetermined communication network.

According to the foregoing configuration, the latest function information can be acquired from the server as needed.

(9) Preferably, the execution unit includes a video output control unit which superimposes graphics on video data acquired by the video input device and displays the same on a video output device, and the function extension device further comprises a graphics generation unit which outputs, to the video output control unit, a drawing request of generating graphics to be superimposed on the selected body and superimposing the generated graphics on the selected body when the processing determined by the processing determination unit is the processing of superimposing graphics on the selected body.

According to the foregoing configuration, when the processing determined as a result of the user operating the selecting body is the processing of superimposing graphics on the selected body, the graphics generation unit outputs, to the video output control unit, a drawing request of generating graphics to be superimposed on the selected body and superimposing the generated graphics on the selected body in the video data. In addition, the video output control unit that received the drawing request superimposes the graphics on the selected body in the video data, and the superimposed video data is displayed on the video output device. Thus, the processing performed to the selected body is visually fed back to the user, and an operational feeling can thus be provided to the user.

(10) Preferably, the execution unit includes a tactile output control unit which controls a tactile output device which provides a tactile sense to a user, and the tactile output control unit drives the tactile output device for providing tactile sense to the user, incidental to the superimposition of graphics on the selected body.

According to the foregoing configuration, when the graphics are superimposed on the selected body, the tactile output device is driven to provide a tactile sense to the user. Thus, the processing performed to the selected body is not only visually fed to back to the user, it is also tactually fed back to the user, and a more exciting operational feeling can be provided to the user. Thus, the user's interest in the operation can be increased.

(11) Preferably, the function extension device further comprises a 3D model management unit which assigns a body identifier to each body recognized by the object recognition unit, generates a 3D stereoscopic model of each body including the body identifier, the type of the body, and the position of the body in the real space, and notifies the function setting unit of the generated 3D stereoscopic model of each body as a object recognition notice, wherein when the object recognition notice is notified from the 3D model management unit, the function setting unit determines that the body indicated by the notified object recognition notice has been recognized by the object recognition unit, and refers to the function information in order to set from the type of recognized body the function to the recognized body.

According to the foregoing configuration, when a body is recognized by the object recognition unit, the 3D model management unit assigns a body identifier to each body, a 3D stereoscopic model of each body including the body identifier, the type of the body, and the position of the body in the real space is generated for each body, and the generated 3D stereoscopic model is notified, as a object recognition notice, to the function setting unit. Thus, since information related to the recognized body is promptly notified to the function setting unit when a body is recognized by the object recognition unit as described above, the function setting unit can promptly set the function to each of the recognized bodies.

(12) Preferably, the 3D model management unit notifies the selection determination unit of body information which associates position data and a body identifier of each body recognized by the object recognition unit, and the selection determination unit recognizes the position, in the real space, of each body recognized by the object recognition unit based on the body information notified by the 3D model management unit, and determines, as the selected body, a body positioned within a predetermined range relative to the input position recognized by the input recognition unit.

According to the foregoing configuration, when a body is recognized by the object recognition unit, body information which associates the body identifier and the position data of each body is notified from the 3D model management unit to the selection determination unit. Thus, the selection determination unit can recognize the position of each body in the real space based on the body information notified from the 3D model management unit. In addition, the selection determination unit can compare the position of each recognized body and the user's input position, and thereby accurately determine, as the selected body, a body within a predetermined range relative to the input position.

Industrial Applicability

The function extension device according to the present invention is useful as a means for dynamically setting a function to a body that was recognized as an object in an extended real world using a head-mount display or the like, according to the type of that body, and using the set function.

The invention claimed is:

1. A function extension device for incorporating a body in a real space into an extended real space, and setting a function to the body,
the function extension device comprising:
an object recognition unit which recognizes, from real-space video data acquired by a video input device, a body included in the video data, and recognizes a type of recognized body and a position of the recognized body in the real space;
a function setting unit which retains function information in which is prescribed a function configured from a pair of operation and processing that can be set for each type of body, refers to the function information when a body is recognized by the object recognition unit, and sets a function to the recognized body based on the type of recognized body;
an input recognition unit which recognizes an input operation performed by a user in the real space and an input position in the real space where the input operation has been performed;
a selection determination unit which determines a selected body selected by the user as a body to be operated based on the position of the body in the real space recognized by the object recognition unit and the input position in the real position recognized by the input recognition unit;
an operation determination unit which determines the operation of the user by using the input operation recognized by the input recognition unit;
a processing determination unit which determines the processing for the operation that has been determined by the operation determination unit among the operations configuring the function set by the function setting unit to the selected body selected by the selection determination unit; and
an execution unit which executes the processing determined by the processing determination unit.

2. The function extension device according to claim 1, wherein
the object recognition unit identifies, for each recognized body, the type of recognized body, and
the function setting unit sets a function to each body even when the bodies are of the same type.

3. The function extension device according to claim 2, wherein
the input recognition unit acquires a user identifier for identifying a user who has performed an input operation,
when a body is recognized by the object recognition unit, the function setting unit presents to a user candidates of operation and processing that can be set to the type of body, sets the operation and processing selected by the user as the function of the body, and associates the set function with the user identifier and retains the same, and
the processing determination unit determines the processing for the operation determined by the operation determination unit among the operations configuring the function set to the user about which the function setting unit holds the user identifier.

4. The function extension device according to claim 2, wherein, when a body is recognized by the object recognition unit, the function setting unit determines the operation and processing that can be set to the body among the operations and processing that can be set to the type of body, and sets the determined operation and processing as the function of the body.

5. The function extension device according to claim 4, wherein
the object recognition unit recognizes a shape and a size of a body, and
the function setting unit determines the operation and processing that can be set to the body based on at least one of the shape and the size of the body recognized by the object recognition unit.

6. The function extension device according to claim 4, wherein the function setting unit determines the operation and processing that can be set to the body recognized by the object recognition unit based on a capability of the function extension device and a capability of a peripheral device connected to the function extension device.

7. The function extension device according to claim 4, wherein, when the function setting unit is connected to an external determination device via a predetermined communication network and a body is recognized by the object recognition unit, the function setting unit requests the external determination device to perform determination processing for determining the operation and processing that can be set to the body among the operations and processing that can be set to the type of the body, and sets the function to the body according to a determination result of the external determination device.

8. The function extension device according to claim 1, wherein the function setting unit acquires the function information from a server connected via a predetermined communication network.

9. The function extension device according to claim 1, wherein the execution unit includes a video output control unit which superimposes graphics on video data acquired by the video input device and displays the same on a video output device,
the function extension device further comprising:
a graphics generation unit which outputs, to the video output control unit, a drawing request of generating graphics to be superimposed on the selected body and superimposing the generated graphics on the selected body when the processing determined by the processing determination unit is the processing of superimposing graphics on the selected body.

10. The function extension device according to claim 9, wherein
the execution unit includes a tactile output control unit which controls a tactile output device which provides a tactile sense to a user, and
the tactile output control unit drives the tactile output device for providing tactile sense to the user, incidental to the superimposition of graphics on the selected body.

11. The function extension device according to claim 1, further comprising:
a 3D model management unit which assigns a body identifier to each body recognized by the object recognition unit, generates a 3D stereoscopic model of each body including the body identifier, the type of the body, and the position of the body in the real space, and notifies the function setting unit of the generated 3D stereoscopic model of each body as a object recognition notice, wherein
when the object recognition notice is notified from the 3D model management unit, the function setting unit determines that the body indicated by the notified object recognition notice has been recognized by the object recognition unit, and refers to the function information in order to set from the type of recognized body the function to the recognized body.

12. The function extension device according to claim 11, wherein
the 3D model management unit notifies the selection determination unit of body information which associates position data and a body identifier of each body recognized by the object recognition unit, and
the selection determination unit recognizes the position, in the real space, of each body recognized by the object recognition unit based on the body information notified by the 3D model management unit, and determines, as the selected body, a body positioned within a predetermined range relative to the input position recognized by the input recognition unit.

13. A function extension method of incorporating a body in a real space into an extended real space, and setting a function to the body,
the method comprising:
an object recognition step of a function extension device recognizing, from real-space video data acquired by a video input device, a body included in the video data, and recognizing a type of recognized body and a position of the recognized body in the real space;
a function setting step of a function extension device retaining function information in which is prescribed a function configured from a pair of operation and processing that can be set for each type of body, and referring to the function information when a body is recognized in the object recognition step, and then setting a function to the recognized body based on the type of recognized body;
an input recognition step of a function extension device recognizing an input operation that has been performed by a user in the real space and an input position in the real space where the input operation has been performed;
a selection determination step of a function extension device determining a selected body that has been selected by the user as the body to be operated, based on the position of the body in the real space recognized by the object recognition step and the input position in the real position recognized in the input recognition step;
an operation determination step of a function extension device determining the operation of the user by using the input operation recognized in the input recognition step;
a processing determination step of a function extension device determining the processing for the operation that has been determined in the operation determination step among the operations configuring the function set in the function setting unit to the selected body selected by the selection determination step; and
an execution step of a function extension device executing the processing determined in the processing determination step.

14. A non-transitory computer-readable recording medium which stores a function extension program for causing a computer to function as a function extension device for incorporating a body in a real space into an extended real space, and setting a function to the body,
the program causing the computer to function as:
an object recognition unit which recognizes, from real-space video data acquired by a video input device, a body included in the video data, and recognizes a type of recognized body and a position of the recognized body in the real space;
a function setting unit which retains function information in which is prescribed a function configured from a pair of operation and processing that can be set for each type of body, refers to the function information when a body is recognized by the object recognition unit, and sets a function to the recognized body based on the type of recognized body;
an input recognition unit which recognizes an input operation performed by a user in the real space and an input position in the real space where the input operation has been performed;
a selection determination unit which determines a selected body selected by the user as the body to be operated, based on the position of the body in the real space recognized by the object recognition unit and the input position in the real position recognized by the input recognition unit;
an operation determination unit which determines the operation of the user by using the input operation recognized by the input recognition unit;
a processing determination unit which determines the processing for the operation determined by the operation determination unit among the operations configuring the function set by the function setting unit to the selected body selected by the selection determination unit; and
an execution unit which executes the processing determined by the processing determination unit.

15. An integrated circuit of a function extension device for incorporating a body in a real space into an extended real space, and setting a function to the body,
the integrated circuit comprising:
an object recognition unit which recognizes, from real-space video data acquired by a video input device, a body included in the video data, and recognizes a type of recognized body and a position of the recognized body in the real space;
a function setting unit which retains function information in which is prescribed a function configured from a pair of operation and processing that can be set for each type of body, refers to the function information when a body is recognized by the object recognition unit, and sets a function to the recognized body based on the type of recognized body;

an input recognition unit which recognizes an input operation performed by a user in the real space and an input position in the real space where the input operation has been performed;

a selection determination unit which determines a selected body selected by the user as the body to be operated, based on the position of the body in the real space recognized by the object recognition unit and the input position in the real position recognized by the input recognition unit;

an operation determination unit which determines the operation of the user by using the input operation recognized by the input recognition unit;

a processing determination unit which determines the processing for the operation determined by the operation determination unit among the operations configuring the function set by the function setting unit to the selected body selected by the selection determination unit; and an execution unit which executes the processing determined by the processing determination unit.

* * * * *